E. SHOPBELL.
Upsetting Wagon Tires.
No. 51,872.
Patented Jan'y 2, 1866.
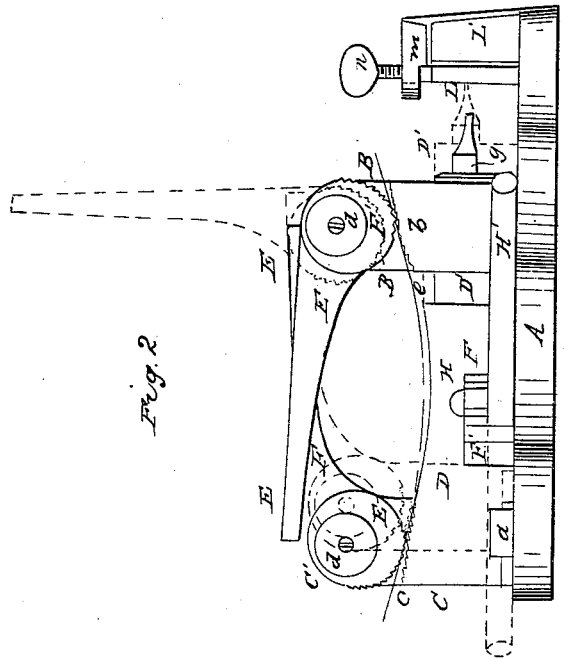
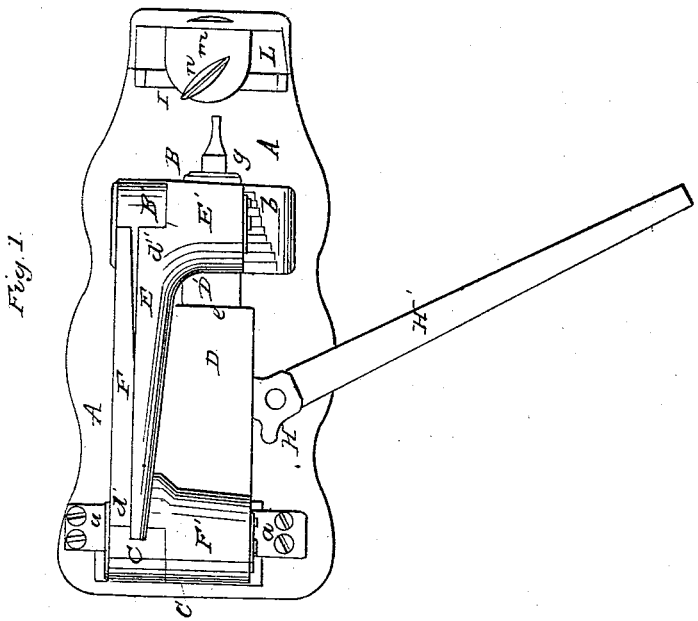
WITNESSES
INVENTOR

UNITED STATES PATENT OFFICE.

ELIAS SHOPBELL, OF ASHLAND, OHIO.

MACHINE FOR UPSETTING WAGON-TIRES.

Specification forming part of Letters Patent No. 51,872, dated January 2, 1866.

*To all whom it may concern:*

Be it known that I, ELIAS SHOPBELL, of Ashland, in the county of Ashland and State of Ohio, have invented certain new and useful Improvements in a Machine for Upsetting Wagon-Tires and Punching the Same; and I do hereby declare that the following is a full and complete description of the construction and operation of the same, reference being had to the accompanying drawings, making a part of this specification, in which—

Figure 1 is a top view of the machine. Fig. 2 is a side view.

Like letters of reference refer to like parts in the views.

My improvement relates to a machine for upsetting wagon-tires and punching them, as hereinafter described.

A represents the bed-plate of the machine. B is a stationary frame secured to the bed-plate, and C is a moving or sliding frame that consists of a standard, C', to one side of which is secured a slide, D. The end D' of the slide extends through an opening in the frame B, in which it moves back and forth. There is a shoulder formed at e by the end D' being less than the other part of the slide, as represented. The top of the slide is curved from c to c, as shown in Fig. 2, and is notched on one end. Opposite this the stationary frame is curved and notched in a similar manner, as at b in Figs. 1 and 2.

To one side of the standards C' and D' of the stationary and moving frames are pivoted or hung, at d, cams E' and F', that project over onto the slide and notched part of the frame B.

E and F are handles or arms of the cams that fit and move at the lower end on the top of the standards, which are rounded. (Shown at d' d''.)

The heads are notched round on the under side, as shown in Fig. 2, like the slide and part b of the frame.

In one side of the slide there is a rack, F, that a segment of a gear-wheel, as represented at H, works in. The gear is formed on the end of a lever, whereby the slide is moved back and forth.

g is a punch secured in the end D' of the slide.

L is a die placed against a standard, L', at one end of the machine, that is held in place by a thumb-screw, n, screwed down onto the top of the die through a lug, m, on the standard.

The manner in which this machine, as constructed, operates in upsetting the tires of wagon-wheels is as follows: The moving frame or slide is moved out more or less from the stationary frame, as shown in the drawings, the distance being gaged according to the circumference of the tire. The cams E' and F' are then both turned up, as indicated by the dotted lines I in Fig. 2, when the tire is adjusted under the cams, as noted by the red line in Fig. 2, when the cams are turned or clamped down upon the tire, as shown in the figures, which will securely hold it. Then the slide is moved more or less into the position indicated by the dotted lines in Fig. 2, by means of the lever, compressing the tire as much as may be desired, when the arms, with the cams, can be turned up and the tire removed.

By means of the puncher g there can be holes made in the tire by placing the tire on the die and moving up the puncher by the lever against the die. Thus the tire can be compressed or upset and holes punched in it with the greatest ease and facility.

What I claim as my improvement, and desire to secure by Letters Patent, is—

1. The construction and arrangement of the herein-described serrated cam-levers E' F', serrated, cogged, and concave slide D, serrated stationary block B, and the cogged segmental lever H', when combined and susceptible of operation, substantially as described.

2. In combination with the above, the arrangement of the punch g, die L, and standard L', for the purpose set forth.

ELIAS SHOPBELL.

Witnesses:
W. H. BURRIDGE,
D. W. GAGE.